United States Patent
Siew et al.

(12) 
(10) Patent No.: US 8,146,716 B2
(45) Date of Patent: Apr. 3, 2012

(54) RESERVOIR TANK FOR HYDRAULIC BRAKE LEVER ASSEMBLY

(75) Inventors: Keen Hoong Siew, Johor (MY); Chan Jin Lim, Johor (MY)

(73) Assignee: Shimano Inc., Sakai, Osaka (JP)

( * ) Notice: Subject to any disclaimer, the term of this patent is extended or adjusted under 35 U.S.C. 154(b) by 498 days.

(21) Appl. No.: 12/233,552

(22) Filed: Sep. 18, 2008

(65) Prior Publication Data

US 2010/0064838 A1    Mar. 18, 2010

(51) Int. Cl.
*B62L 3/02* (2006.01)
*B60T 11/22* (2006.01)

(52) U.S. Cl. ..................... 188/24.22; 188/344
(58) Field of Classification Search ............. 188/24.22, 188/26, 344; 60/588, 594
See application file for complete search history.

(56) References Cited

U.S. PATENT DOCUMENTS

| | | | |
|---|---|---|---|
| 6,003,639 A | 12/1999 | Buckley | |
| 6,871,729 B2* | 3/2005 | Huster et al. | 188/344 |
| 6,957,534 B2 | 10/2005 | Lumpkin | |
| 7,178,646 B2 | 2/2007 | Lumpkin | |
| 7,654,366 B2* | 2/2010 | Matsushita | 188/344 |
| 2003/0121736 A1 | 7/2003 | Lumpkin | |
| 2003/0121739 A1 | 7/2003 | Lumpkin | |
| 2004/0055840 A1 | 3/2004 | Lumpkin | |
| 2004/0118641 A1 | 6/2004 | Huster | |
| 2005/0056508 A1* | 3/2005 | Laghi | 188/344 |
| 2005/0199450 A1* | 9/2005 | Campbell et al. | 188/24.15 |
| 2008/0155982 A1 | 7/2008 | Jones et al. | |
| 2009/0120750 A1* | 5/2009 | Chen | 188/344 |

FOREIGN PATENT DOCUMENTS

| | | |
|---|---|---|
| DE | 202008009997 U1 | 10/2008 |
| EP | 1439116 A2 * | 7/2004 |
| EP | 1 514 791 A | 3/2005 |
| EP | 1 526 066 A | 4/2005 |
| TW | 321400 U | 11/2007 |
| WO | WO 2005/087574 A1 | 9/2005 |
| WO | WO 2008/093226 A2 | 8/2008 |

OTHER PUBLICATIONS

European Search Report dated Feb. 19, 2010 from corresponding European Application No. 09158887.1-2425.

* cited by examiner

*Primary Examiner* — Thomas J Williams
(74) *Attorney, Agent, or Firm* — Jeffer Mangels Butler & Mitchell LLP

(57) ABSTRACT

Described herein is a hydraulic brake lever assembly that includes a clamp member that includes a handle bar opening, a housing extending outwardly from the clamp member, and a lever pivotally connected to the clamp member. The housing includes a cylinder defined therein that includes a master piston. The clamp member and the housing cooperate to define a reservoir having a first portion and a second portion. The first portion is substantially located in the housing and extends substantially parallel to the cylinder and the second portion is substantially located in the clamp member between the handle bar opening and the lever.

9 Claims, 4 Drawing Sheets

RESERVOIR TANK FOR HYDRAULIC BRAKE LEVER ASSEMBLY

FIELD OF THE INVENTION

The present invention relates to hydraulic brake lever assemblies, and more particularly, to a reservoir tank for a hydraulic disc brake lever assembly.

BACKGROUND OF THE INVENTION

In recent years, certain high performance bicycles have included hydraulic disc brakes. Hydraulic disc brake systems typically include a caliper housing, a first movable brake pad and a second fixed or movable brake pad. The movable brake pad is typically attached to a piston that is movable in response to fluid pressure applied via a hydraulic fluid conduit in the caliper housing. The brake pads are positioned on either side of a rotor, which is attached to the front or rear wheel of a bicycle. Upon the application of fluid pressure to the piston or pistons, the brake pads come into contact with the rotor, thereby applying frictional resistance and causing the bicycle to slow down or stop.

Hydraulic disc brake systems for bicycles are typically actuated by a brake lever attached to a bicycle handlebar. They also typically include a master piston in a master cylinder which is actuated by the brake lever. The master cylinder contains a hydraulic fluid and is in fluid communication with the disc brake caliper via a fluid conduit. The brake pads are typically spaced apart from the rotor by a predetermined gap. As the lever is contracted towards the handlebar, the master piston moves, thereby forcing liquid out of the master cylinder and into a conduit connected to the caliper housing. The movement of fluid into the caliper housing causes the pistons to move, eventually bringing the brake pads into contact with the rotor. Once the brake pads contact the rotor, they provide frictional resistance which can be increased by further operation of the lever. At this point, the caliper housing is fully pressurized, and further operation of the lever increases the system hydraulic pressure and frictional resistance applied to the rotor.

Some of the hydraulic fluid in the system is contained in a fluid reservoir that is often located on the brake lever assembly at a location where the reservoir and its housing could be damaged if a rider was to have an accident.

Accordingly, a need exists for a hydraulic disc brake lever system that addresses the foregoing problems.

SUMMARY OF THE PREFERRED EMBODIMENTS

According to a first aspect of the present invention there is provided a hydraulic brake lever assembly that includes a clamp member that includes a handle bar opening, a housing extending outwardly from the clamp member, and a lever pivotally connected to the clamp member. The housing includes a cylinder defined therein that includes a master piston. The clamp member and the housing cooperate to define a reservoir having a first portion and a second portion. The first portion is substantially located in the housing and extends substantially parallel to the cylinder and the second portion is substantially located in the clamp member between the handle bar opening and the lever.

In a preferred embodiment, when the assembly is secured to a handlebar, the first portion of the reservoir is substantially parallel to the handlebar and is located between the cylinder and the handlebar. The first portion of the reservoir has a first end and a second end and the second end is in fluid communication with the second portion of the reservoir and the first portion is remote from the second portion of the reservoir. The reservoir and the cylinder are in fluid communication by a port that is located adjacent the first end of the first portion of the reservoir. The clamp member includes a removable cover for covering the reservoir. In a preferred embodiment, the housing extends from one side of the clamp member and the cover is located on the opposite side of the clamp member. The clamp member includes a pair of opposed threaded receivers formed integrally therewith and a pair of openings defined therein. The threaded fasteners extend through the openings in the clamp and into the threaded receivers. In an embodiment, an exterior surface of the threaded receivers partially define the second portion of the reservoir.

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
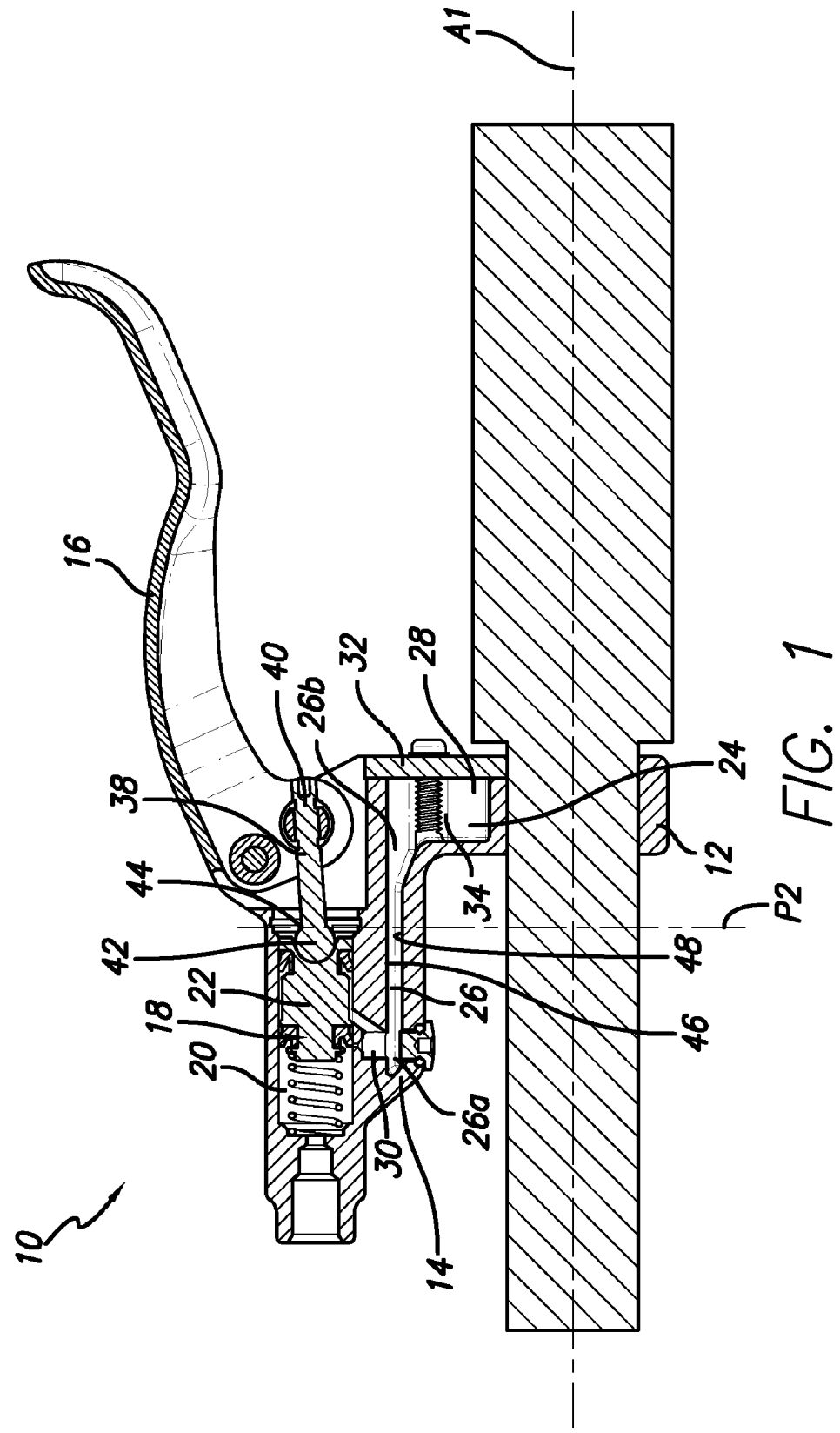
FIG. 1 is a cross-sectional plan view of a brake lever assembly having a hidden reservoir tank in accordance with a preferred embodiment of the present invention.
Figure 2:
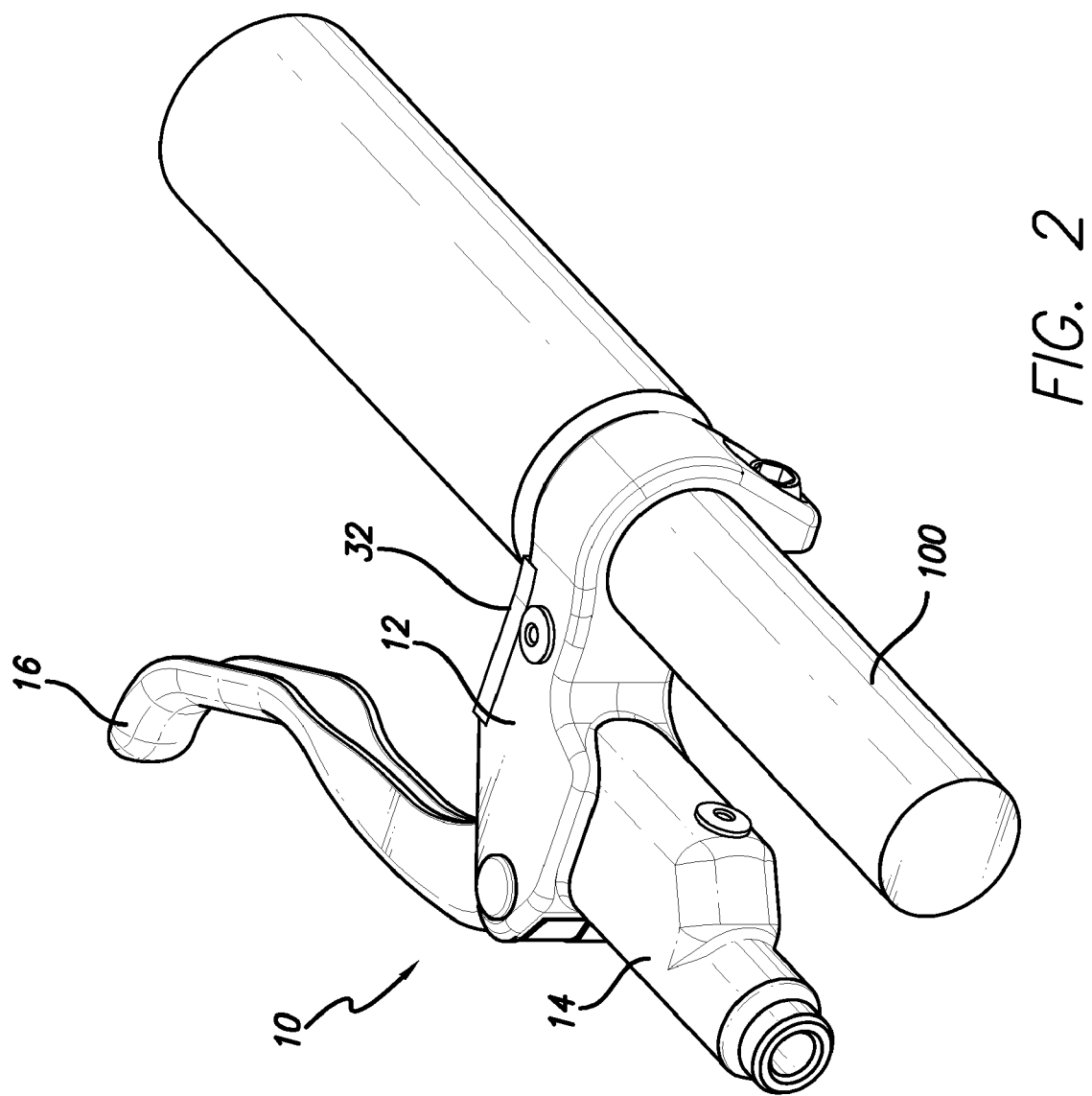
FIG. 2 is a perspective view of the brake lever assembly of FIG. 1.
Figure 3:
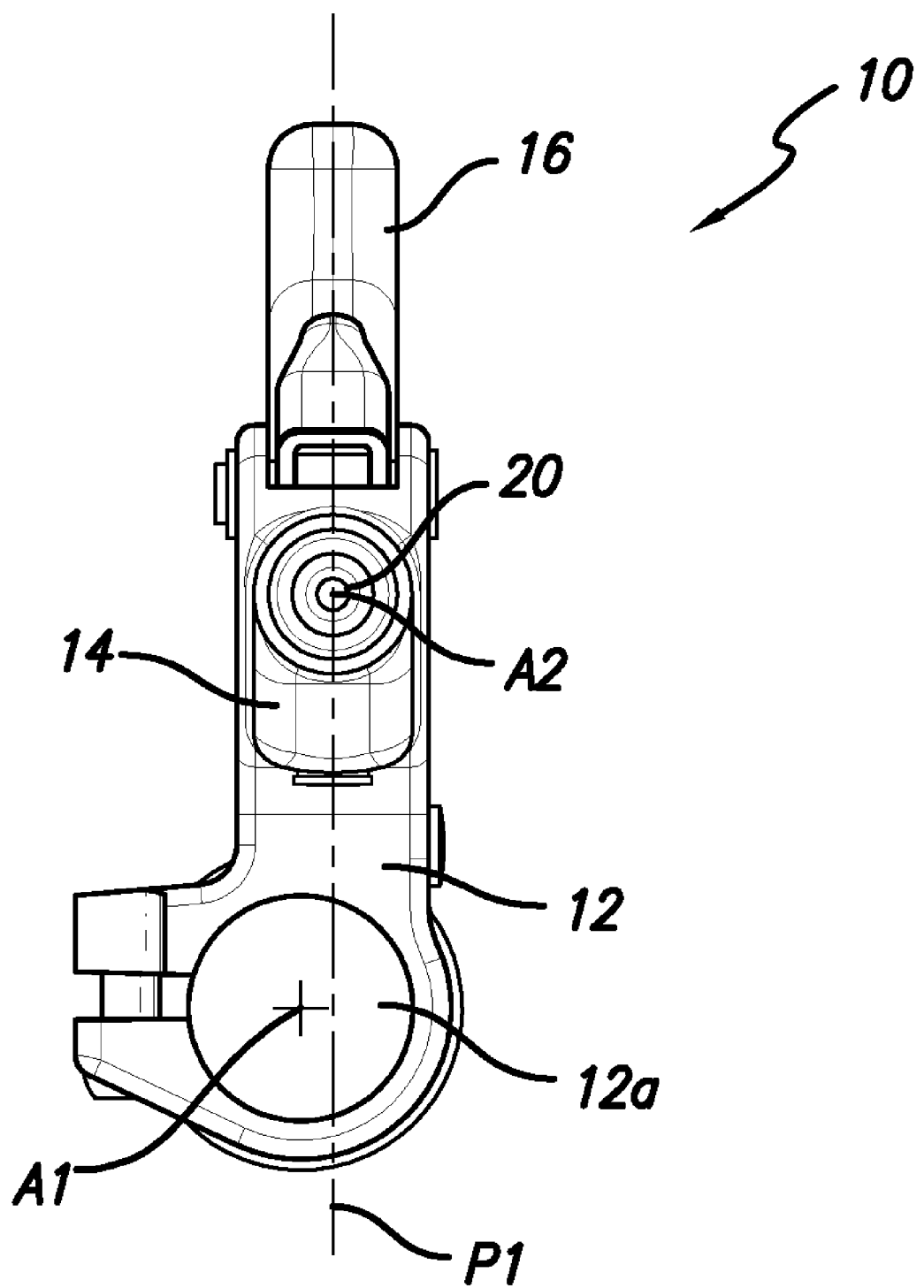
FIG. 3 is an elevational view of the brake lever assembly of FIG. 1.

Referring to FIGS. 1-3, a preferred embodiment of a bicycle brake lever assembly 10 is described. Brake lever assembly 10 is preferably a hydraulic brake lever assembly operatively connected to a hydraulic disc brake system.

Brake lever assembly 10 is preferably attached to a bicycle handlebar 100 by a clamp member 12 or other suitable attachment mechanism and generally includes a housing 14 and a brake lever 16 pivotally connected to the clamp member 12. Housing 14 preferably houses a master cylinder assembly 18, that includes a cylinder 20 and a master piston 22.

As shown in FIG. 1, in a preferred embodiment, a reservoir 24 is defined in the clamp member 12 and the housing 14. The reservoir 24 includes a first portion 26 and a second portion 28. Preferably, the first portion 26 is substantially located in the housing 14 and the second portion 28 is substantially located in the clamp member 12. In a preferred embodiment, the first and second portions 26 and 28 cooperate to define a generally "L" shaped reservoir 24. As shown in FIG. 1, the first portion 26 is generally long and narrow and extends substantially parallel to the axis A2 defined by cylinder 20. The clamp member 12 includes a handlebar opening 12a through which the handlebar 100 extends. Preferably, the first portion 26 extends substantially parallel to the handlebar 100 and is located between the handlebar 100 and the cylinder 20.

The brake lever assembly 10 also includes a push rod 38 having a shaft 40 operatively associated with the brake lever 16 and a head 42 operatively associated with the piston 22. A plane P2 is defined at a point 44 where the head 42 and the shaft 40 meet. The first portion 26 of the reservoir 24 includes front and back walls 46 and 48 that partially define the reservoir 26 and extend approximately parallel to one another.

Plane P2 intersects the front wall 46 and the back wall 48 at a point where the front wall and the back wall extend approximately parallel to one another.

The housing 14 also includes a port 30 that provides fluid communication between the first portion 26 of the reservoir 24 and the cylinder 20. In a preferred embodiment, the first portion 26 of the reservoir 24 includes first and second ends 26a, 26b and the port 30 is located adjacent to the first end 26a.

Figure 4:
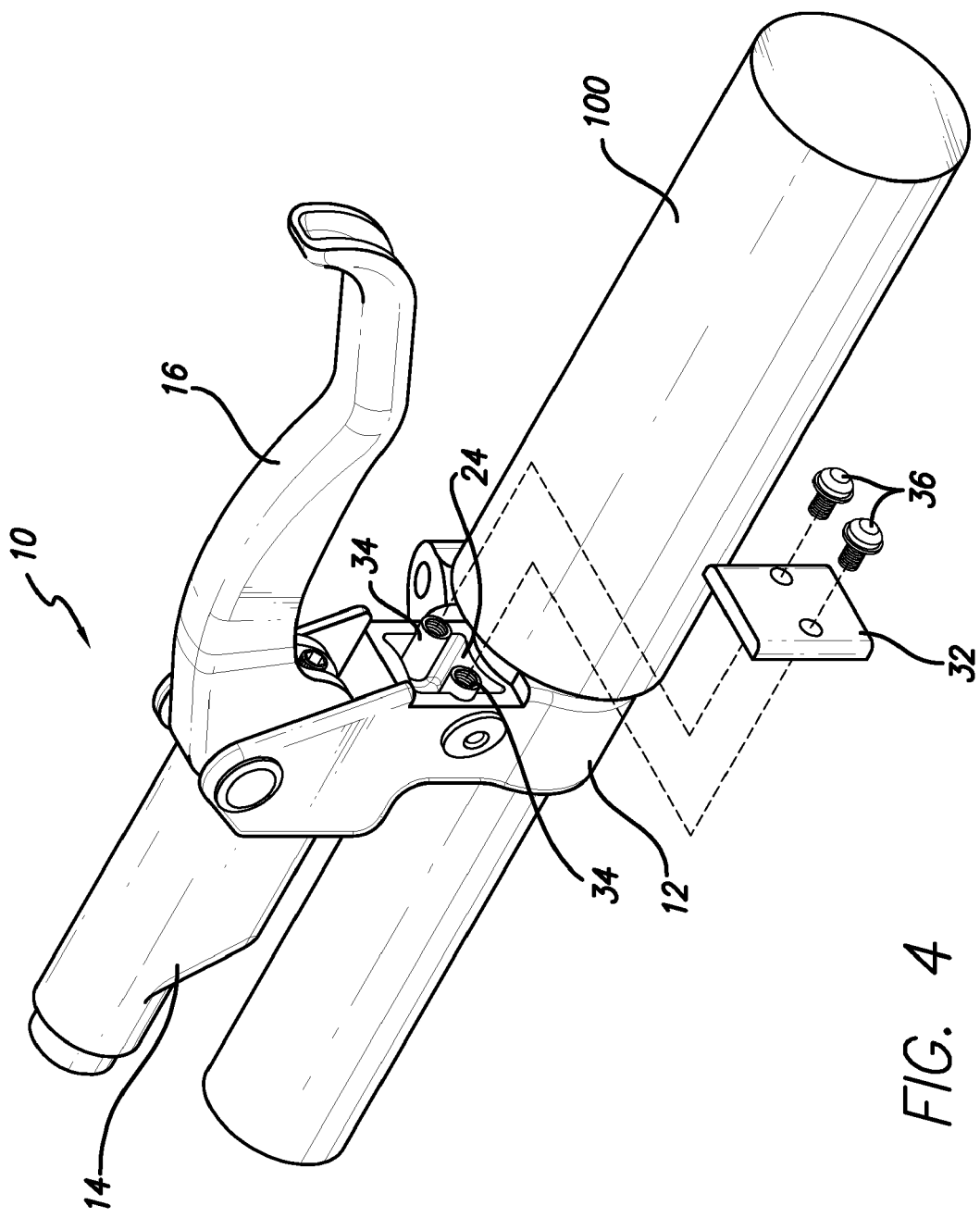
FIG. 4 is another perspective view of the brake lever assembly of FIG. 1 with the cover exploded off to show the reservoir.

As shown in FIGS. 1-2 and 4, the clamp member 12 includes a cover 32 for covering the reservoir 24. Referring to FIG. 1, when the assembly 10 is viewed from the top, the clamp member 12 has right and left sides. The housing 14 extends from the left side and the cover 32 is located on the right side. Preferably, the cover 32 defines a plane that extends substantially perpendicular to the clamp axis A1. As shown in FIG. 4, the cover 32 is preferably secured onto the clamp member 12 by threaded fasteners 36 that are received in threaded receivers 34 that partially define the second portion 28 of the reservoir. However, this is not a limitation on the present invention. The cover 32 can be held on by other means.

Referring to FIG. 3, in a preferred embodiment, the cylinder 20 defines an axis A2, which is bisected by a plane P1. The components of the assembly 10 are preferably configured so that plane P1 is offset from clamp axis A1.

The embodiments described above are exemplary embodiments of a the present invention. Those skilled in the art may now make numerous uses of, and departures from, the above-described embodiments without departing from the inventive concepts disclosed herein. Accordingly, the present invention is to be defined solely by the scope of the following claims.

What is claimed is:

1. A hydraulic brake lever assembly comprising:
a clamp member that includes a handle bar opening that defines a clamp axis,
a lever pivotally connected to the clamp member,
a housing extending outwardly from the clamp member, wherein the housing includes a cylinder defined therein that defines a cylinder axis and includes a master piston therein,
a push rod having a shaft operatively associated with the lever and a head operatively associated with the piston, wherein a first plane is defined at a point where the head and the shaft meet, wherein the first plane extends approximately perpendicular to the cylinder axis, and wherein the clamp axis and the cylinder axis extend approximately parallel to one another,
wherein the clamp member and the housing cooperate to define a reservoir having a first portion and a second portion, wherein the first portion is substantially located in the housing, wherein the first portion includes front and back walls that partially define the reservoir and extend approximately parallel to one another and approximately parallel to the cylinder axis, wherein the first plane intersects the front wall and the back wall at a point where the front wall and the back wall extend parallel to one another, and wherein the second portion is substantially located in the clamp member between the handle bar opening and the lever, wherein the cylinder axis is bisected by a second plane,
wherein the second plane bisects both the cylinder and the lever, wherein the second plane is offset from the clamp axis.

2. The hydraulic brake lever assembly of claim 1 wherein when the assembly is secured to a handlebar, the first portion of the reservoir is substantially parallel to the handlebar and is located between the cylinder and the handlebar.

3. The hydraulic brake lever assembly of claim 1 wherein the first portion of the reservoir has a first end and a second end, wherein the second end is in fluid communication with the second portion of the reservoir and wherein the first portion is remote from the second portion of the reservoir.

4. The hydraulic brake lever assembly of claim 3 wherein the reservoir and the cylinder are in fluid communication by a port, and wherein the port is located adjacent the first end of the first portion of the reservoir.

5. The hydraulic brake lever assembly of claim 1 wherein the clamp member includes a removable cover for covering the reservoir.

6. The hydraulic brake lever assembly of claim 5 wherein the housing extends in a direction substantially parallel to the clamp axis from one side of the clamp member and the cover is located on the opposite side of the clamp member, wherein the clamp member includes first and second threaded receivers formed integrally therewith, wherein the cover includes a pair of openings defined therein, wherein threaded fasteners extend through the openings in the cover and into the first and second threaded receivers, wherein a third plane bisects the first and second threaded receivers, and wherein the third plane extends between, but does not intersect, the clamp axis and the cylinder axis.

7. The hydraulic brake lever assembly of claim 5 wherein the threaded receivers include ends that extend outside the reservoir and into the openings in the cover.

8. The hydraulic brake lever assembly of claim 7 wherein the threaded receivers include an exterior wall with a curved shape that partially defines the second portion of the reservoir.

9. The hydraulic brake lever assembly of claim 1 wherein the clamp member includes a clamp bolt that defines an axis, and wherein the plane never intersects the axis defined by the clamp bolt.

* * * * *